(12) United States Patent
Sijpkes et al.

(10) Patent No.: US 8,501,073 B2
(45) Date of Patent: Aug. 6, 2013

(54) DEVICE FOR INJECTING A RESIN INTO AT LEAST ONE FIBRE LAYER OF A FIBRE-REINFORCED PRODUCT TO BE MANUFACTURED

(75) Inventors: Tjaard Sijpkes, Geldrop (NL); Peet Vergouwen, Boekel (NL); Bert Thuis, Marknesse (NL)

(73) Assignee: Fokker Landing Gear B.V., Helmond (NL)

( * ) Notice: Subject to any disclaimer, the term of this patent is extended or adjusted under 35 U.S.C. 154(b) by 81 days.

(21) Appl. No.: 11/913,463

(22) PCT Filed: Apr. 14, 2006

(86) PCT No.: PCT/NL2006/000199
§ 371 (c)(1),
(2), (4) Date: Mar. 7, 2008

(87) PCT Pub. No.: WO2006/118442
PCT Pub. Date: Nov. 9, 2006

(65) Prior Publication Data
US 2008/0191387 A1    Aug. 14, 2008

(30) Foreign Application Priority Data
May 3, 2005   (NL) .................................. 1028945

(51) Int. Cl.
*B29C 45/33*    (2006.01)
*B29C 45/37*    (2006.01)
(52) U.S. Cl.
USPC .... 264/313; 425/555; 425/577; 425/DIG. 14; 425/DIG. 112; 264/314; 249/178; 249/180; 249/184

(58) Field of Classification Search
USPC .................. 249/178, 180, 184; 425/468, 555, 425/577, DIG. 14, DIG. 112; 264/313, 314
See application file for complete search history.

(56) References Cited

U.S. PATENT DOCUMENTS 2,831,542 A * 4/1958 Lynes et al. .................... 285/298
3,032,288 A * 5/1962 Tidland ....................... 242/571.1

(Continued)

FOREIGN PATENT DOCUMENTS

DE  1 185 365      1/1965
EP  0 491 650 A2   6/1992

(Continued)

OTHER PUBLICATIONS

Office Action mailed Jan. 25, 2011, in Japanese Patent Application No. 2008-509955, filed Apr. 14, 2006 (English-language Translation only).

(Continued)

*Primary Examiner* — Joseph Del Sole
*Assistant Examiner* — Ryan Ochylski
(74) *Attorney, Agent, or Firm* — Oblon, Spivak, McClelland, Maier & Neustadt, L.L.P.

(57) ABSTRACT

The invention provides a device for injecting a resin into at least one fiber layer of a fiber-reinforced product (5) to be manufactured, comprising a mold (2, 3) having a mold cavity (4) that is surrounded by a mold wall for abutment of the product thereagainst in the closed condition of the mold. A rigid part (3a, 3b, 3c, 3d) of the mold wall is movable with respect to another part of the mold wall in the closed condition of the mold so as to ensure a continued abutment of the movable part of the mold wall with the products when shrinkage of the resin caused by curing thereof takes place subsequent to the injection process.

7 Claims, 1 Drawing Sheet

U.S. PATENT DOCUMENTS

| | | | | |
|---|---|---|---|---|
| 3,090,093 | A * | 5/1963 | Long | 425/356 |
| 3,490,973 | A * | 1/1970 | Reinecke et al. | 156/156 |
| 3,557,992 | A * | 1/1971 | Reeves | 220/592.25 |
| 3,704,970 | A * | 12/1972 | Reeves | 425/128 |
| 4,084,739 | A * | 4/1978 | Koltz et al. | 228/168 |
| 4,812,273 | A * | 3/1989 | Bevan | 264/71 |
| 4,893,765 | A * | 1/1990 | Randolph | 242/571.6 |
| 5,356,692 | A * | 10/1994 | Perez | 428/116 |
| 5,498,150 | A | 3/1996 | Check | |
| 5,648,105 | A * | 7/1997 | Shimazu et al. | 425/139 |
| 2001/0009308 | A1* | 7/2001 | Kinpara et al. | 264/46.4 |
| 2003/0011104 | A1 | 1/2003 | Hock et al. | |
| 2004/0150138 | A1 | 8/2004 | Hiroi et al. | |
| 2004/0241273 | A1 | 12/2004 | Hermann et al. | |
| 2005/0042109 | A1 | 2/2005 | Kovalsky et al. | |
| 2005/0064061 | A1* | 3/2005 | Eichlseder | 425/548 |

FOREIGN PATENT DOCUMENTS

| | | |
|---|---|---|
| FR | 1 037 332 | 9/1953 |
| FR | 1 355 744 | 3/1964 |
| FR | 2 812 838 | 2/2002 |
| JP | 4-294110 | 10/1992 |
| JP | 5-124118 | 5/1993 |
| JP | 2004-535313 | 11/2004 |

OTHER PUBLICATIONS

Office Action mailed Oct. 18, 2011, in Japanese Patent Application No. 2008-509955, filed Apr. 14, 2006 (English-language Translation only).

Office Action mailed Aug. 7, 2012, in Japanese Patent Application No. 2008-509955, filed Apr. 14, 2006 (English-language Translation only).

* cited by examiner

DEVICE FOR INJECTING A RESIN INTO AT LEAST ONE FIBRE LAYER OF A FIBRE-REINFORCED PRODUCT TO BE MANUFACTURED

BACKGROUND

The present invention relates to a device for injecting a resin into at least one fibre layer of a fibre-reinforced product to be manufactured, comprising a mould having a mould cavity that is surrounded by a mould wall for abutment of the product thereagainst in the closed condition of the mould. More specifically, the invention is directed at a device by means of which fibre-reinforced constructional members can be manufactured, in particular for use in aircraft, for example as (a part of) landing gear systems, propeller blades and helicopter blades, and especially hollow constructional members.

It is known to use a liquid moulding technology referred to as RTM (Resin Transfer Moulding) for manufacturing such constructional members. The device according to the introductory paragraph is known in relation to the use of said RTM technology. With this technology, the fibre reinforcements are first completely assembled into a preform, after which said preform is injected with the liquid resin in a negative mould. Traditionally an inner mould and an outer mould defining a mould cavity between them have been used for forming hollow constructional members. The fibre reinforcements are placed more or less in the form of a mat in said cavity, after which liquid resin is injected into the mould cavity and thus into the fibre reinforcements. After curing, the product thus formed is removed from the mould to be subjected to further processing steps in order to obtain a fibre-reinforced constructional member as the final product.

A problem that occurs during the curing process of the resin is that a certain degree of shrinkage of the resin may take place, to the extent of a few percent (for example two to three percent), as a result of which the product tends to come loose from the mould wall against which the product abuts at the start of the injection process. This may lead to the formation of external but also internal cracks in the material, for example caused by delamination, and/or to imperfections at the surface. These negative effects increase as the thickness of the material of the product increases.

SUMMARY

The object of the present invention is to overcome the aforesaid negative effects of shrinkage of the resin. In order to accomplish that object, a rigid part of the mould wall is typically movable with respect to another part of the mould wall in the closed condition of the mould so as to ensure a continued abutment of the movable part of the mould wall with the products when shrinkage of the resin caused by curing thereof takes place subsequent to the injection process. Thus it can be ensured that no voids will be formed upon shrinkage of the resin, which might be conducive to the formation of cracks or which might cause the product to fail otherwise. Using the device according to the invention it is possible to continue to exert the (constant) pressure on the (final) free surface of the products during the curing process of the resin. The fact that the movable parts is rigid furthermore achieves that an adequate control of the final surface structure of the products and the contours thereof is retained. The mould forms a semi-rigid tool in that case, which makes it possible to retain a precise control of the geometry and the surface structure of the product.

A special preferred embodiment for use in the manufacture of a hollow product is obtained if the mould comprises an inner mould to be positioned in the cavity of the product and an outer mould to be positioned on the outer side of the product, wherein at least a rigid part of the inner mould is movable in the closed condition of the mould.

A very suitable embodiment of the device according to the invention is obtained if the mould wall comprises rigid mould wall segments which are interconnected by means of a flexible material, more preferably a resilient material. Thus the mould wall can readily follow the movement of the product upon shrinkage of the resin.

An optimum abutment of the movable parts of the mould wall against the product during shrinkage of the resin is obtained if the device is provided with pressure means for pressing the movable part of the mould wall against the product upon shrinkage of the resin. Such pressure means might be made up of compression springs, for example.

Alternatively, and possibly even in combination therewith, the pressure means furthermore preferably comprise a pressure chamber on the side of the movable part of the mould wall remote from the product for pressing the movable part of the mould wall against the product upon shrinkage of the resin under the influence of the pressure that prevails inside the pressure chamber. An important advantage related to the use of such a pressure chamber is the possibility to control the force by which the movable part of the mould wall abuts against the product, which can be done by varying the pressure inside the pressure chamber.

A highly efficient embodiment is obtained if the pressure chamber at least substantially adjoins the entire circumference of the inner mould.

To heat the resin so as to set the curing process going, the mould is preferably provided with heating channels for a heating fluid by means of which the product in the mould can be heated.

On the other hand, the mould is furthermore preferably (also) provided with cooling channels for a coolant by means of which the product in the mould can be cooled. It should be realised in this connection that the curing process of resin, in particular epoxy resin, is an exothermal process.

According to a further aspect thereof, the present invention relates to a method for manufacturing a fibre-reinforced hollow product, comprising the steps of injecting a resin into an intermediate space formed by an outer mould and an inner mould as well as into the product to be manufactured, which is present in the intermediate space, and curing the resin subsequent to the injection thereof, wherein wall parts of the outer mould and/or the inner follow the movement of the product to be manufactured upon shrinkage thereof.

The advantages of using such a method had already been discussed above in the explanation of the device according to the present invention.

The present invention further relates to the use of a device according to the present invention for manufacturing a hollow, fibre-reinforced product consisting of resin and fibres.

BRIEF DESCRIPTION OF THE DRAWINGS

The present invention will now be explained in more detail by means of a description of two preferred embodiments of the device according to the invention, in which reference is made to the following schematic figures.

DETAILED DESCRIPTION

Figure 1:
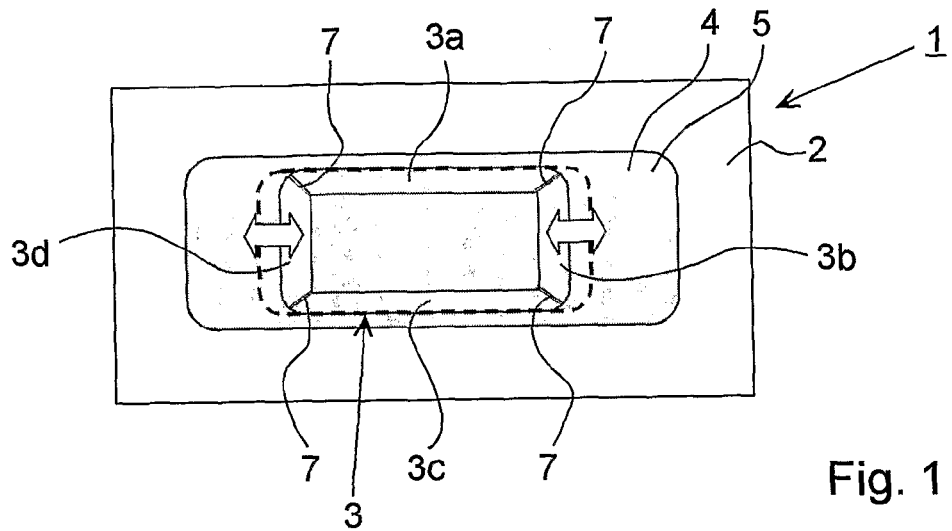
FIG. 1 is a cross-sectional view of a first preferred embodiment of a device according to the invention.

FIG. 1 shows a mould 1 made up of an outer mould 2 and an inner mould 3. Present between the outer mould 2 and the inner mould 3 is a mould cavity 4, which is completely filled with a hollow product 5 or at least a preform thereof comprising at least one fibre layer with fibres of, for example, glass, carbon, aramid (Kevlar) or polyamide. The product 5 is rectangular in shape, at least in cross-sectional view, and completely surrounds the inner mould 3, abutting against the outer circumference of the inner mould. On the other hand, the product 5 is positioned within the outer mould 2. Although the outer mould 2 is shown as one whole in FIG. 1, said outer mould 2 will consist of at least two parts in practice, which can be disconnected from each other so as to make it possible to place the product 5 into the mould cavity 4 and remove it therefrom again at a later point in time.

As is furthermore shown in FIG. 1, the product 5 has a substantially hollow rectangular shape, with the short sides having a relatively large wall thickness and the long sides having a relatively small wall thickness.

The inner mould 3 comprises four plate-shaped mould wall segments 3a, 3b, 3c, 3d, which are made of a metal, such as a steel-nickel alloy (for example Invar), steel or stainless steel. The mould wall segments 3a, 3b, 3c, 3d are interconnected by means of a flexible material, such as rubber, an elastomer or silicone, at the location of the corners between the long sides and the short sides of the inner mould 3. Said connecting material, which has flexible, resilient properties, enables the mould wall segments 3a, 3b, 3d, 3d to move relative to each other and relative to the outer mould 2.

A closed space is defined between the mould wall segments 3a, 3b, 3c, 3d, which space forms a pneumatic pressure chamber 6, in which the pneumatic pressure can be varied by means of a compressor, a pressure cylinder or nitrogen gas. The mould wall segments 3a, 3b, 3c, 3d will tend to move outwards from the centre of the inner mould 3 under the influence of an elevated pressure within the pressure chamber 6, which movement is also made possible by the flexible nature of the connection 7 between the mould wall segments 3a, 3b, 3c, 3d.

The inner mould 3 (as well as the inner mould 13 of the second preferred embodiment yet to be discussed hereinafter) may also have functioned as a winding mandrel during a prior stage, around which mandrel the fibres of the product 5 have been wound or braided.

In use of the mould 1, a resin is injected into the product 5 via resin channels (not shown) in the outer mould 2 and/or the inner mould 3. To that end a sub-atmospheric pressure may have been generated in the mould cavity 4 first so as to assist in the spreading of the resin material between the fibres of the at least one fibre layer thereof. Alternatively, or in combination therewith, the resin may also be injected under an elevated pressure. After such an injection process, curing of the resident takes place under an elevated pressure (for example up to 6 bar) and an elevated temperature. The elevated temperature can be achieved by transporting a heated fluid, for example oil, through heating channels (not shown) provided in the outer mould 2 and/or the inner mould 3.

A certain degree of shrinkage (typically two to three percent) of the material will occur during the curing process thereof, in any case when an epoxy resin is used), as a result of which the product 5 will tend to come loose from the outer mould 2 and/or the inner mould 3. This tendency will be greatest at the location of the mould wall segments 3b and 3d, since the wall thickness of the product 5 is largest at that location.

A continued abutment of the inner mould 3, more specifically of the mould wall segments 3b and 3d, against the product 5 can be ensured, in spite of the shrinkage of the product 5 at the location of the short sides thereof, by exerting a suitable pressure within the pressure chamber 6, resulting in a significantly reduced risk of crack formation or of the occurrence of other (surface) imperfections.

During a later stage of the process, the heating channels may also be used for transporting a coolant therethrough for the purpose of cooling the product 5 during the curing process of the resin following the injection thereof, which may be necessary on account of the exothermal nature of the curing process.

After the resin in the product 5 has cured, the product 5 is removed from the mould cavity 4 to be subjected to further processing steps in order to obtain a final product, such as a hollow, fibre-reinforced constructional member, for example for use in the aerospace industry.

Figure 2:
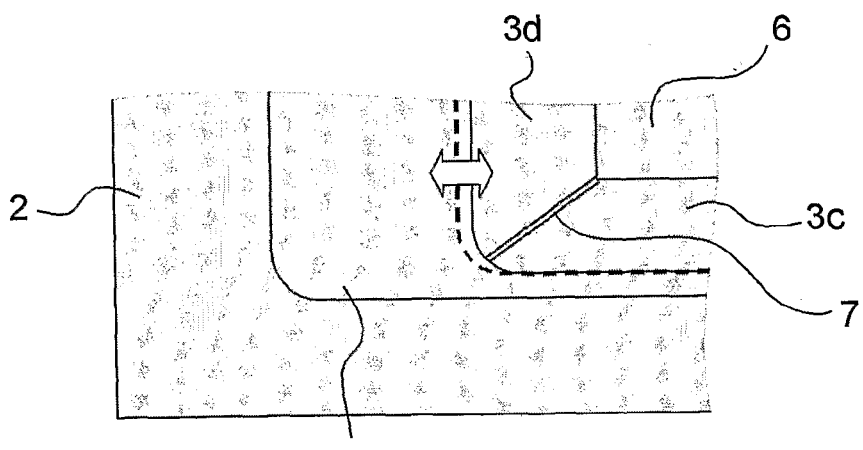
FIG. 2 shows a detail of FIG. 1.
Figure 3:
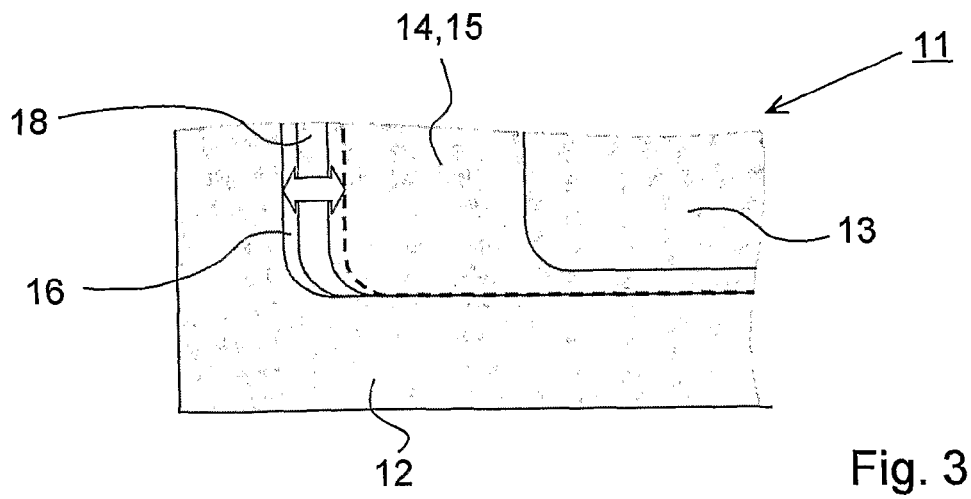
FIG. 3 shows a detail, at a position comparable to the position shown in FIG. 2, of a second preferred embodiment of a device according to the invention.

FIG. 3 shows an alternative embodiment of a device according to the invention, which may also be combined with the first preferred embodiment as shown in FIGS. 1 and 2 for that matter. The mould 11, only a detail of which is shown in FIG. 3, which detail corresponds to the detail that is shown in FIG. 2, comprises an outer mould 12 and an inner mould 13 of a solid material, which may also be substituted for an inner mould 3 according to FIGS. 1 and 2. Defined between the outer mould 12 and the inner mould 13 is a mould cavity 14, within which a product 15 is present, with the shape of the mould cavity 14 and the product 15 essentially corresponding to those of the mould cavity 4 and the product 5, respectively, according to FIGS. 1 and 2.

As already indicated before, the resin tends to shrink during the curing process thereof after it has been injected into the product 15, as a result of which the product 15 may tend to come loose from the outer mould 2. To prevent this, a mould wall segment 18 is provided at the location of the short sides of the outer mould 2, on the side of which remote from the product 15 a pressure chamber 16 is provided. The pressure in the pressure chamber 16 can be varied by means of a compressor. A continued abutment of the mould wall segment 18 against the outer side of the (short side of the) product 15 during the shrinking process of the resin can be effected by increasing the pressure inside the pressure chamber 16.

The invention claimed is:

1. A device for injecting under an elevated pressure a resin into at least one fibre layer of a fibre-reinforced hollow product to be manufactured, comprising:

a mould having a mould cavity that is surrounded by a mould wall for abutment of the fibre-reinforced hollow product thereagainst in a closed condition of the mould, a rigid part of the mould wall being movable with respect to another part of the mould wall in the closed condition of the mould to ensure a continued abutment of the movable part of the mould wall with the fibre-reinforced hollow product when shrinkage of the resin caused by curing thereof takes place subsequent to the injection process; and a pressure unit for pressing the movable part of the mould wall against the fibre reinforced hollow product upon shrinkage of the resin, wherein the mould includes an inner mould to be positioned in a cavity of the fibre-reinforced hollow product and an outer mould to be positioned on an outer side of the product, and at least a rigid part of the inner mould is movable in the closed condition of the mould, wherein a mould wall of the inner mould comprises rigid mould wall segments interconnected by a flexible material, wherein the pressure unit comprises a pressure chamber on a side of the movable part of the mould wall remote from the fibre-reinforced hollow product for pressing the movable part of the mould wall against the fibre-reinforced hollow product upon shrinkage of the resin under the influence of the pressure that prevails within the pressure chamber, and wherein the pressure chamber at least substantially adjoins the entire circumference of the inner mould.

2. A device according to claim 1, wherein said flexible material is resilient.

3. A device according to claim 1, wherein the mould is provided with heating channels for heating fluid by means of which the fibre-reinforced hollow product in the mould can be heated.

4. A device according to claim 1, wherein the mould is provided with cooling channels for a coolant by means of which the fibre-reinforced hollow product in the mould can be cooled.

5. The device according to claim 1, wherein at least one of the inner mould and the outer mould includes a resin channel to supply resin to the mould cavity.

6. A method for manufacturing a fibre-reinforced hollow product, comprising:

injecting under an elevated pressure a resin into a mould having a mould cavity that is surrounded by a mould wall for abutment of the fibre-reinforced hollow product thereagainst in a closed condition of the mould, a rigid part of the mould wall being movable with respect to another part of the mould wall in the closed condition of the mould to ensure a continued abutment of the movable part of the mould wall with the fibre-reinforced hollow product when shrinkage of the resin caused by curing thereof takes place subsequent to the injection process wherein the mould includes an inner mould to be positioned in a cavity of the fibre-reinforced hollow product and an outer mould to be positioned on an outer side of the product, and at least a rigid part of the inner mould is movable in the closed condition of the mould, wherein a mould wall of the inner mould comprises rigid mould wall segments interconnected by a flexible material, wherein the mold is provided with a pressure unit for pressing the movable part of the mould wall against the fibre-reinforced hollow product upon shrinkage of the resin, wherein the pressure unit comprises a pressure chamber on a side of the movable part of the mould wall remote from the fibre-reinforced hollow product for pressing the movable part of the mould wall against the fibre-reinforced hollow product upon shrinkage of the resin under the influence of the pressure that prevails within the pressure chamber, and wherein the pressure chamber at least substantially adjoins the entire circumference of the inner mould, the resin being injected into an intermediate space being formed by the outer mould and the inner mould, the fiber-reinforced hollow product being manufactured in the intermediate space, and curing the resin subsequent to the injection thereof, while the movable rigid part of the inner mould follows the movement of the fiber-reinforced hollow product upon shrinkage thereof.

7. The method according to claim 6, wherein the fibre-reinforced hollow product consists of resin and fibres.

\* \* \* \* \*